Dec. 12, 1967  D. MAGUIRE  3,357,437
TREATMENT OF TOBACCO
Filed Feb. 21, 1966
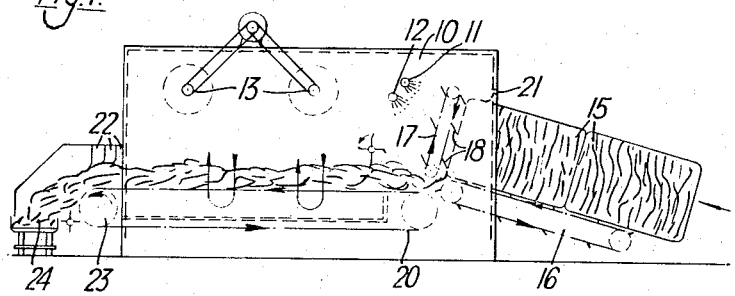
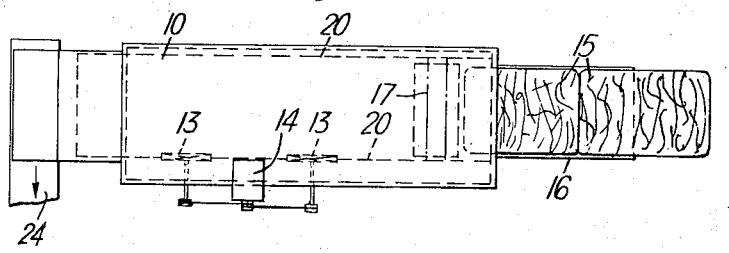
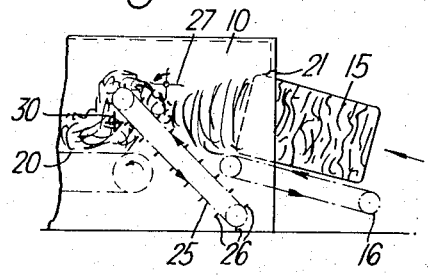
Inventor
DONALD MAGUIRE
By *Imrie & Smiley*
Attorneys

United States Patent Office 3,357,437
Patented Dec. 12, 1967

3,357,437
TREATMENT OF TOBACCO
Donald Maguire, Lodge View 29, The Lawns,
Rolleston-on-Dove, England
Filed Feb. 21, 1966, Ser. No. 528,987
9 Claims. (Cl. 131—136)

This invention relates to the treatment of tobacco.

When tobacco leaf is stored in a warehouse usually in the form of tightly packed hogsheads, cases, bales or the like, the moisture content becomes reduced to such an extent that the leaf is too dry and brittle to be handled. Before the tightly packed mass can be unpacked, therefore, the most careful steps have to be taken to restore some of the moisture content.

In the processes at present available the hogsheads or other relatively solid masses of leaf are placed in treatment chambers and processed usually by the action of steam, sometimes also under vacuum, until the moisture content of the mass has been suitably changed. Obviously, it is very difficult to ensure a uniform moisture content throughout a hogshead or the like and the process is therefore difficult to carry out satisfactorily. Subsequently the treated hogsheads or the like are removed from the treatment chamber and the unpacking operation can begin. The processing of the leaf is then resumed.

The object of this invention is to provide an improved process by which the changing of the moisture content or the unpacking of the hogsheads, bales, cases or other packages can be carried out more conveniently, expeditiously and successfully. For the sake of convenience in description the packages of leaf to be treated will be hereinafter referred to simply as hogsheads, it being understood that the term is used in a broad sense to include all other forms in which the leaf, whether threshed or otherwise, can be presented for the treatment.

The invention also embodies apparatus suitable for carrying out the improved process.

The invention consists in a process by which a particular surface layer of the hogshead parallel with the laminations of the leaf is subjected to a moist air stream or streams which not only acts to restore the moisture content to that surface layer but also acts or assists to strip, peel off or withdraw leaf from that surface of the hogshead so that the leaf in the entire hogshead is progressively moistened and unpacked in a single continuous process.

The invention also consists in an apparatus having a moving support for the hogsheads and a chamber of casing in suitable positional relationship with the support, together with means for supplying moist air and/or steam to the chamber or casing and creating movement of that air tending to strip, peel off or withdraw leaf from a particular surface of the hogshead parallel with the laminations of the leaf. If desired a mechanical stripping device may be provided to assist in removing the surface layer, for instance a tined scraper or wiper.

Constructional forms of the invention will now be described with reference to the accompanying drawings, in which:

FIGURE 1 is a diagrammatic sectional elevation showing a typical conditioning plant.

FIGURE 2 is a plan.

FIGURE 3 is a similar view to FIGURE 1 showing an alternative arrangement.

Referring to FIGURES 1 and 2, a suitable insulated chamber or casing 10 is provided carrying spraying devices 11, 12 for discharging atomised sprays of steam and water at a suitable position. Circulating fans 13 driven by a motor 14 continuously re-circulate the moist air at controlled temperature and humidity. Hogsheads of tobacco 15 are delivered in an upwardly inclined or horizontal direction into one end of the chamber 10 by a loading conveyor 16. The leading end of each hogshead is subjected to the action of the sprays which tend to strip off the moistened surface layer. The stripping may be assisted by an endless conveyor 17 carrying tines 18. The partly conditioned tobacco stripped from the leading end of the hogshead 15 falls on to a slatted or perforated main conveyor 20 which carries the loose tobacco horizontally through the chamber to the discharge end by which stage its conditioning is completed. Seals 21 are provided around the entrance at the loading end of the chamber and exit curtain seals 22 are provided at the exit end, where also the loose tobacco may be acted upon by a discharge doffing rake 23. As the moist air stream, assisted by the tines 18 when these are provided, peels off successive leaf from the top of the hogshead therefore, its moisture content can be restored within close limits to the appropriate amount, before it is carried away through the discharge outlet. Immediately outside this the leaf is directed on to a moving conveyor 24 or other delivery means.

FIGURE 3 shows an alternative way of handling the tobacco as it falls from the leading end of the hogshead. In this arrangement there is no mechanical stripper but there is an elevator 25 with rakes 26 which gather up the tobacco and carries it upwards to a doffing rake 27 which in turn restricts the bulk passed forward and over the higher end of the elevator 25, and thus ensures that there shall be a continuous uniform depth falling on to the conveyor 20. A soft bladed doffing rake 30 is fitted to assist in the break-up of the pads of leaf delivered from the elevator 25.

In some cases the moist air may be cool instead of heated, if cold conditioning of the leaf is to be practised. The moist air may have a temperature range of 40° F. up to 210° F. according to individual requirements.

It will be seen that only the surface layer of the tobacco will be subject to the treatment and that therefore the whole bulk can be conditioned evenly. The process also lends itself to an automatic blending action by which a number, say for example six or more hogsheads, can be treated simultaneously in six different treatment stations each delivering its output on to a separate conveyor or the like and the several conveyors merging, or the several outputs can be delivered on to a single conveyor and the whole blended from that. Thus manual intervention in the processing of tobacco leaf is still further reduced.

I claim:

1. Apparatus for treating packages of tobacco in the nature of hogsheads having the tobacco leaf packed in flat laminations, comprising means for supporting the package including means for advancing the package into the apparatus so that the leading surface of the advancing package is parallel with the laminations, means for subjecting the said surface to the pressure action of moist fluid, said moist fluid constituting means acting not only to restore moisture content to the said surface layer of the package but also to remove leaf from that surface layer, so that the leaf in the entire package is progressively moistened and unpacked in a single continuous process.

2. Apparatus as claimed in claim 1 comprising a chamber, said advancing means being positioned to carry packages into the chamber, and said fluid means constituting a spray means mounted in the chamber positioned to act on the leading surface of the package thus carried into the chamber.

3. Apparatus as claimed in claim 2 having a loading end and a discharge end to said chamber, said supporting means including a loading conveyor positioned to deliver packages into the loading end of the chamber, and a main conveyor in said chamber positioned to receive the tobacco leaf removed from the package and carry it through the chamber to the discharge end thereof.

4. Apparatus as claimed in claim 3 having also therein a mechanical stripping device positioned to assist in removing the moistened surface layer from the package and deliver it on to the main conveyor.

5. Apparatus as claimed in claim 4 in which the stripping device is in the form of an endless conveyor carrying tines.

6. Apparatus as claimed in claim 3 having an elevator device positioned to gather up the tobacco from the moistened surface layer of the package and a rake mounted near the higher end of the elevator positioned to regulate the discharge of the leaf on to the main conveyor.

7. Apparatus as claimed in claim 1 wherein said fluid means includes steam for subjecting said package surface to pressure action.

8. Apparatus as claimed in claim 1 wherein said fluid means includes water for subjecting said package surface to pressure action.

9. Apparatus as claimed in claim 3 having fans mounted in the chamber to promote circulation of the moist air.

References Cited

UNITED STATES PATENTS

| | | | |
|---|---|---|---|
| 655,513 | 8/1900 | Proctor | 131—136 |
| 1,753,573 | 4/1930 | Lorentz | 131—146 |
| 1,757,477 | 5/1930 | Rosenhoch | 131—136 |
| 2,591,026 | 4/1952 | Touton | 131—136 |
| 2,867,220 | 1/1959 | Cahn et al. | 131—136 |
| 2,873,747 | 2/1959 | Schlossmacher | 131—149 |
| 3,224,452 | 12/1965 | Franklin et al. | 131—136 |

FOREIGN PATENTS 1,009,085  5/1957  Germany.

ALDRICH F. MEDBERY, *Primary Examiner.*